A. E. DOLBEAR.
Electro-Dynamometer.
No. 228,807.   Patented June 15, 1880.
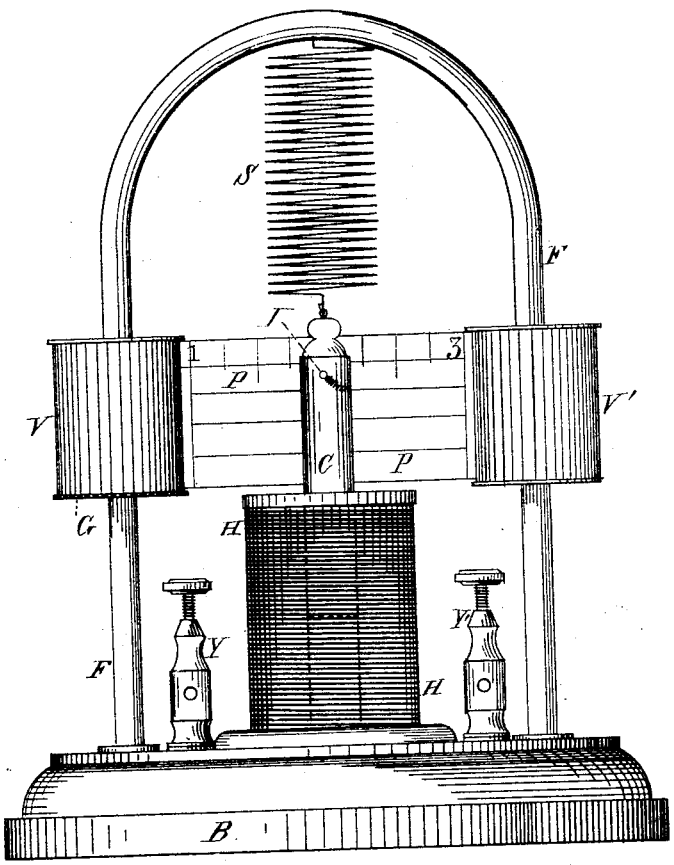

UNITED STATES PATENT OFFICE.

AMOS E. DOLBEAR, OF SOMERVILLE, MASSACHUSETTS.

ELECTRO-DYNAMOMETER.

SPECIFICATION forming part of Letters Patent No. 228,807, dated June 15, 1880.

Application filed February 5, 1879.

*To all whom it may concern:*

Be it known that I, AMOS E. DOLBEAR, of Somerville, in the county of Middlesex and State of Massachusetts, have invented a new and useful Improvement in Electro-Dynamometers, which improvement is fully set forth in the following specification, reference being had to the accompanying drawing.

The object of my invention is the accurate measurement of a current of electricity that is conveyed by a coil or helix of large copper wire placed between a battery, a magneto-electric machine, or other generator of electricity, and the point where the force of the current is expended, either in producing motion, light, or other effective action.

The dynamic effect is shown whenever a current is passing, and is read by the use of any suitable scale and index, and the action during each hour, or any definite time, is recorded upon a paper scale moved by clock-work.

The force of the current and the length of time it is used being thus known, the instrument becomes a meter or standard on which the charge for use of the current in lighting or for other purposes is based.

In the drawing making a part of this specification, the circular base of the instrument is represented at B. This supports the frame F, to the top of which the spiral spring S is attached. The iron core C is suspended from the lower end of the spiral spring directly over the central hole of the helix H, which rests in an upright position upon the base B. Near the top of the iron core C a pencil, I, is affixed, the point of which is in contact with the graduated strip of paper P, and marks the variable positions of the suspended core within the helix H. The paper P is wound upon the bobbin V', from which it passes, and is wound upon the bobbin V, that is driven by the gear G and suitable attached clock-work.

The binding-screws Y Y' are connected, respectively, with the ends of the wire of the coil in the usual manner, and when in use one conducting-wire leads from one of the binding-screws to the generator of electricity, the other screw receiving the wire that leads to the point where the electro-motive force is utilized.

When a current of electricity is made to pass through the coil H its inductive influence upon the iron core is such as to develop magnetism in it, and it is drawn into the coil with a force which is measured directly by the tension upon the spring S, and the strength of this induced magnetism is varied in proportion to the strength of the current that traverses the coil.

The amount of motion allowed to the core C may be varied by using a suspension-spring of greater or less strength.

The strip of record-paper is divided by marks (as at 1 to 3) representing hours or minutes, and may also have a vertical graduation to indicate the force of the current in webers, or in the common measure of weight, as pounds or grains.

The record or indication of the motion of the core may be shown by an attached lever, by reflection of a ray of light, or other well-known means of enlargement for convenience in reading.

It is intended that the instrument be at all times in the circuit, and that the wire of which the helix H is made be large enough to transmit very strong currents and with a very small amount of resistance.

What I claim is—

In combination with the helix H, the core C, and the spring S, or its equivalent, the fixed index or the recording-pencil I and the traversing record-paper P, as herein described.

AMOS E. DOLBEAR. [L. S.]

In presence of—
GEO. F. FULLER,
JOHN M. BATCHELDER.